June 1, 1937.  A. Y. DODGE  2,082,444
TRANSMISSION
Filed Oct. 14, 1933   8 Sheets-Sheet 2

INVENTOR.
Adiel Y. Dodge
BY
ATTORNEY

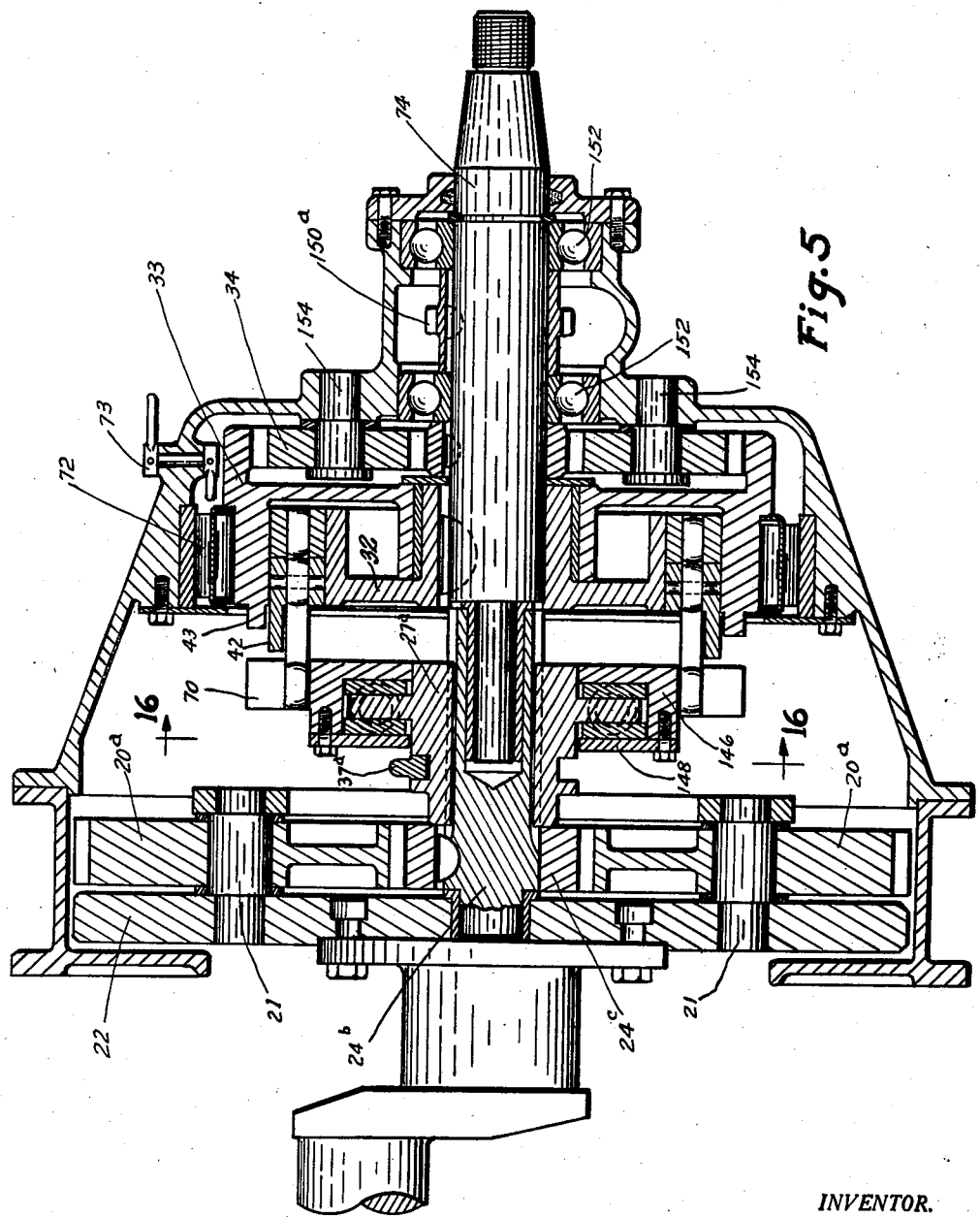

June 1, 1937.  A. Y. DODGE  2,082,444
TRANSMISSION
Filed Oct. 14, 1933  8 Sheets-Sheet 4

INVENTOR.
Adiel Y. Dodge
BY
ATTORNEY.

June 1, 1937.　　　　A. Y. DODGE　　　　2,082,444
TRANSMISSION
Filed Oct. 14, 1933　　　　8 Sheets-Sheet 5
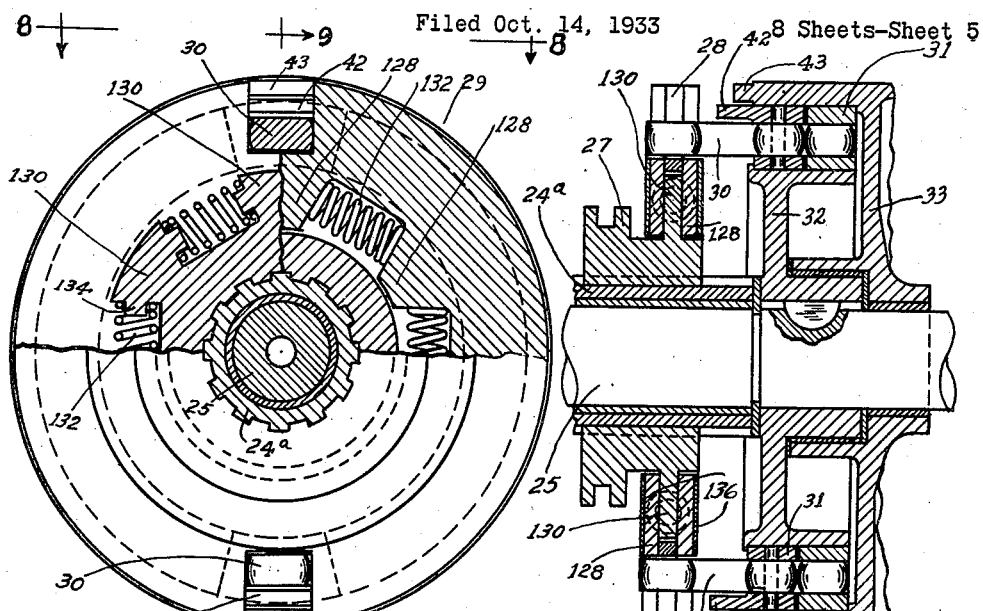
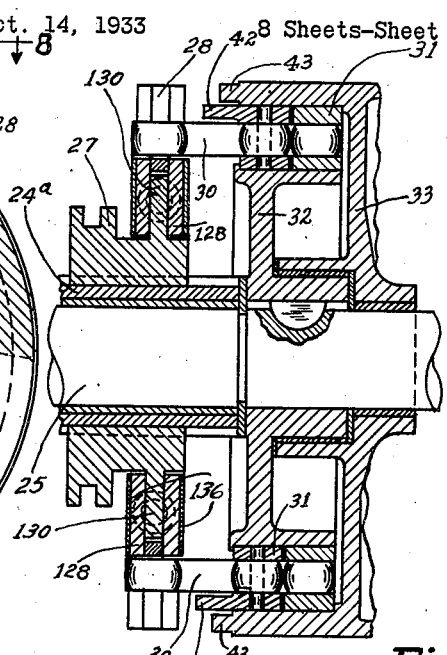
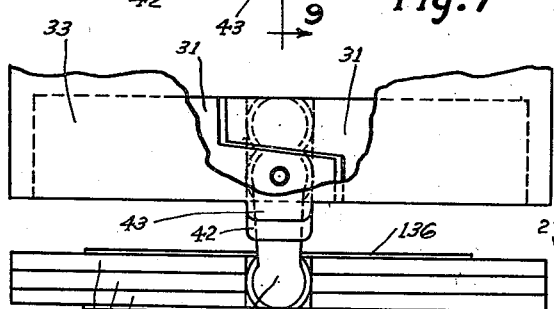
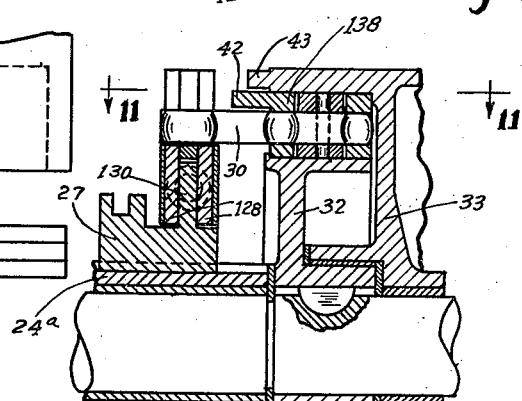
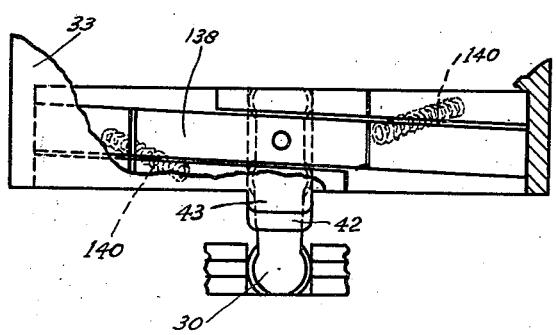
INVENTOR.
Adiel Y. Dodge
BY
ATTORNEY.

June 1, 1937.  A. Y. DODGE  2,082,444
TRANSMISSION
Filed Oct. 14, 1933  8 Sheets-Sheet 6

INVENTOR.
Adiel Y. Dodge
BY
ATTORNEY.

June 1, 1937.  A. Y. DODGE  2,082,444
TRANSMISSION
Filed Oct. 14, 1933  8 Sheets-Sheet 7

INVENTOR.
Adiel Y. Dodge
BY
ATTORNEY.

June 1, 1937.  A. Y. DODGE  2,082,444
TRANSMISSION
Filed Oct. 14, 1933  8 Sheets-Sheet 8

INVENTOR.
Adiel Y. Dodge

BY

ATTORNEY.

Patented June 1, 1937

2,082,444

UNITED STATES PATENT OFFICE 2,082,444

TRANSMISSION

Adiel Y. Dodge, South Bend, Ind.

Application October 14, 1933, Serial No. 693,569

36 Claims. (Cl. 74—260)

This invention relates to transmissions, and is illustrated as embodied in an automobile transmission of the centrifugal impulse infinitely variable type.

An object of the invention is to provide improved means for reversing the negative impulses and causing them to drive in the same direction as the positive impulses, thus giving a smoother and more continuous flow of power. Preferably the negative impulses are reversed by means of pinions or the like having fixed fulcrums such as pivots mounted on the transmission housing. Another feature is to so arrange a transmission of this character that it has a positive low gear, and preferably also a positive reverse gear, instead of relying at all times on the impulse driving means which is comparatively ineffective at low speeds.

I prefer to arrange the transmission so that, while in its normal setting it has a free-wheeling action, the free-wheeling can be thrown out at will to give positive drive, for example to prevent the car from over-running the engine in descending a steep and slippery hill. The control lever of the illustrated transmission has positions giving forward, neutral, reverse, free-wheeling, and positive drive.

Another important feature relates to providing the intermittent or impulse drive with novel reversible one-way clutch means which facilitates also improvements in the arrangement of the drive. This novel means includes a friction gripping means of large area, instead of the usual clutching rollers with their line contacts. Several alternative forms of large-area gripping devices of this character are shown in the drawings; these devices embody substantial novelty both in themselves and in combination in the transmission.

Preferably the reversible clutch device is actuated in both phases, i. e. by both the positive and negative impulses, being first contracted to drive in one direction and then expanded to drive in the other direction. This not only simplifies the construction, but has the great advantage of insuring absolutely complete release of the drive in one direction before the drive in the opposite direction takes hold.

Another feature relates to a novel yielding drive to smooth out the driving impulses, and in which a single set of springs is used to give a yielding drive in both directions.

Other features relate to a simple but powerful friction brake or clutch holding device shown connected to the clutch pedal, to a novel arrangement of gearing for driving in reverse, and to other novel combinations of parts and desirable particular constructions which will be apparent from the following description of the illustrative embodiments shown in the accompanying drawings, in which:

Figure 4 is a partial section on the line 4—4 of Figure 1, showing the control of the free-wheel means;

Figure 5 is a vertical section longitudinally through a second transmission embodying another embodiment of the invention;

Figure 7 is a partial transverse section on the line 7—7 of Figure 1, showing the yielding driving means;

Figure 12:
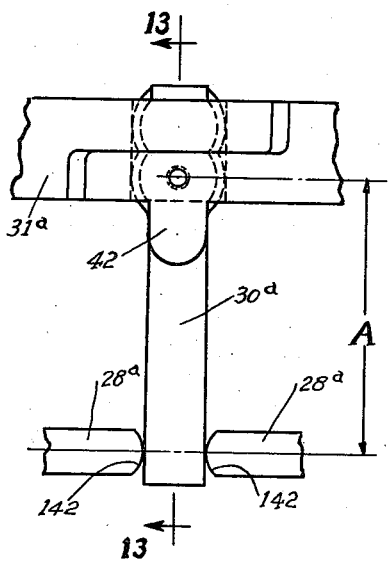
Figure 13:
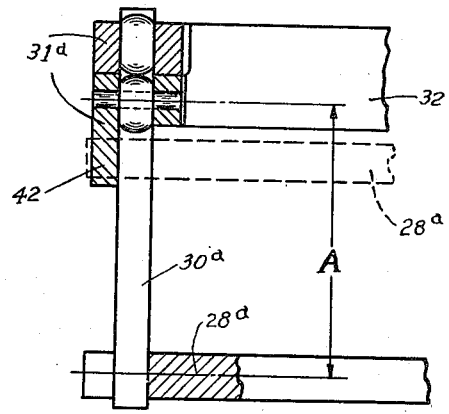
Figure 15:
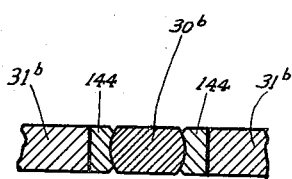
Figure 16:
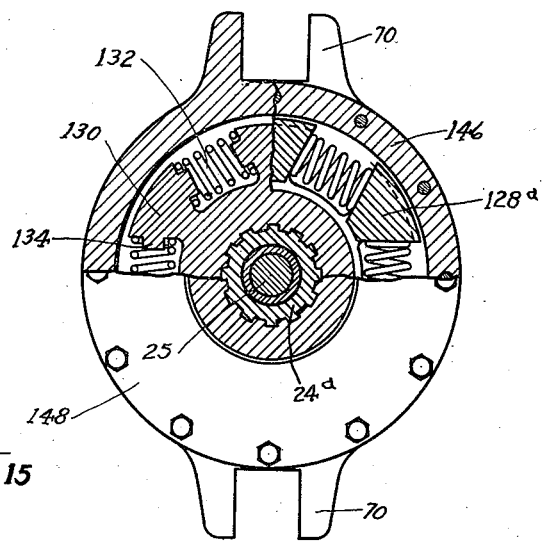
Figure 14:
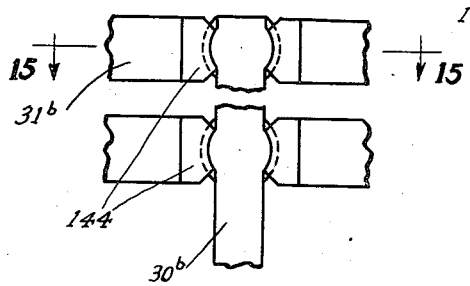
Figure 17:
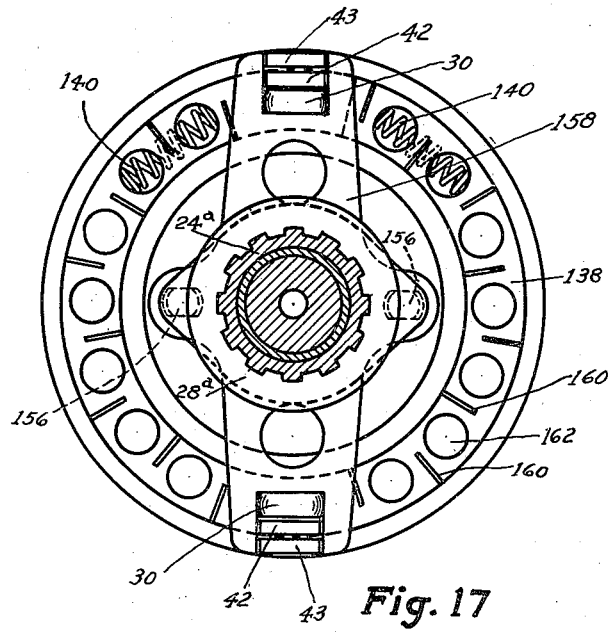
Figure 19:
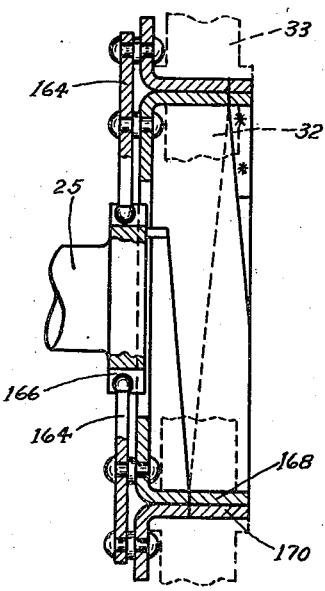
Figure 18:
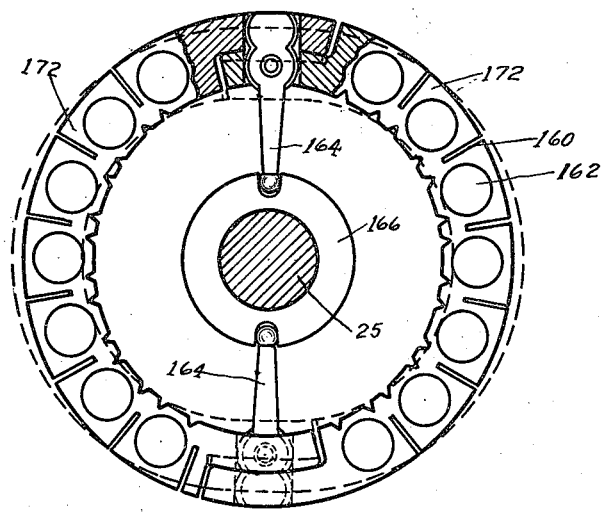
Figure 20:
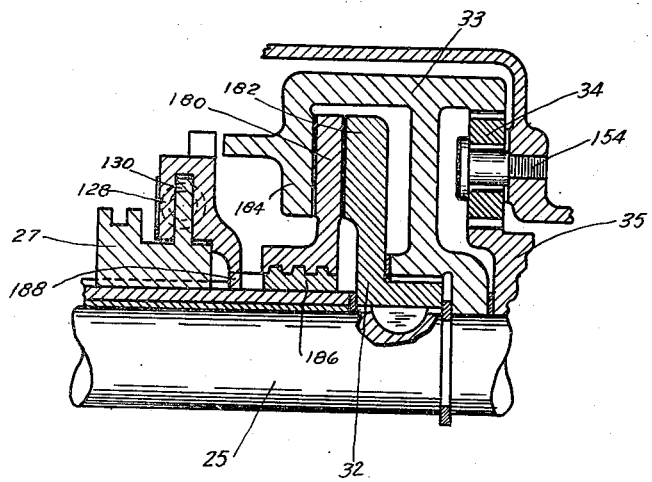
Figure 21:
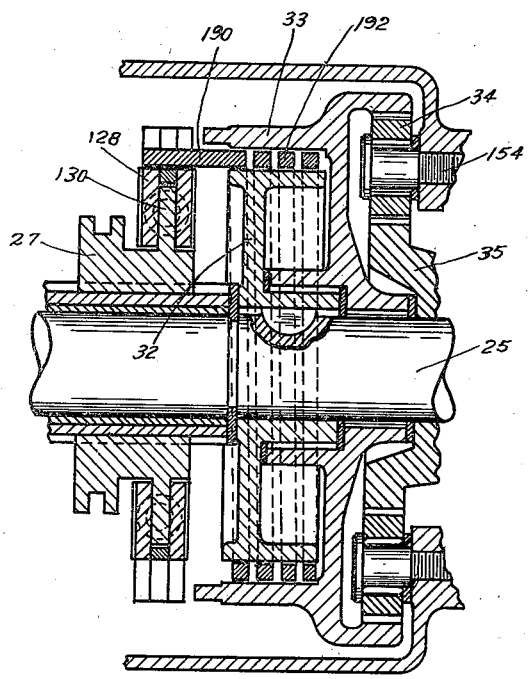

Figures 8 and 9 are partial sections on the lines 8—8 and 9—9 of Figure 7, showing the operation of the reversible friction one-way clutch;

Figure 10 is a section corresponding to Figure 9, but showing a different form of friction member in the one-way clutch;

Figure 11 is a partial section on the line 11—11 of Figure 10, showing the arrangement of the convolutions of the helical friction member;

Figures 12 and 13 are partial sections showing another form of one-way reversible clutch device;

Figures 14 and 15 are partial sections showing still another clutch;

Figure 16 is a partial section on the line 16—16 of Figure 5, showing the yielding driving means;

Figures 17 and 18 are transverse sections showing two more different clutches;

Figure 19 is a section diametrically through another clutch;

Figure 20 is a partial longitudinal section through the upper part only of a transmission utilizing a friction surface member shifted into one or the other of two engaging positions by means of a screw and nut; and Figure 21 is a partial longitudinal section through another transmission having a helical wrapping band for a friction one-way clutch member.

The illustrated transmission is of the impulse type, and includes counterweighted double-diameter planet gears 20 mounted on pins 21 carried by the engine flywheel 22. The counterweighted gears 20 mesh with a pair of sun gears 23 and 24. The sun gears 23 and 24 are coaxially mounted on a shaft 25 and have sleeves 23ᵃ and 24ᵃ extending rearwardly therefrom. The sleeves are splined to take sliding members 26 and 27 respectively.

According to the principles of impulse transmissions, the counterweighted planet gears 20, when driven by the flywheel 22, revolve about their own centers and also about the axis of shaft 25, and give positive and negative impulses which are transmitted to the sun gears 23 and 24.

Figure 1:
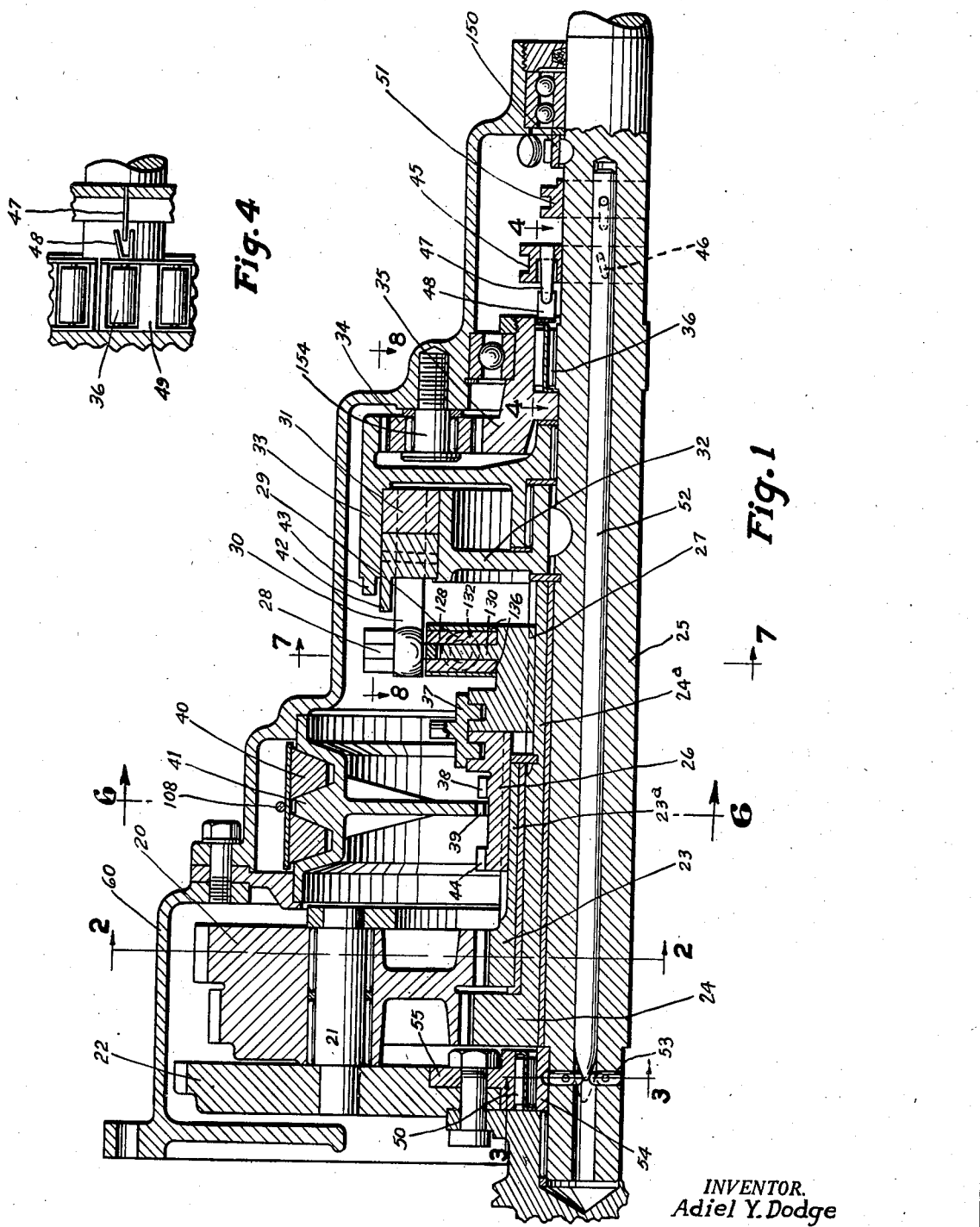
Figure 1 is a longitudinal vertical section through the upper half of a transmission embodying one form of the invention.

When the transmission is set as shown in Figure 1, for forward drive, the positive and negative impulses thus set up in sleeve 24ᵃ are imparted to the sliding member 27, which is connected to a forked member 28 by means of a yielding coupling 29, more fully described below. The impulses thus imparted to the forked member 28 are in turn transmitted to one or a pair of levers 30, which cause a wrapping friction clutch member 31 to expand and contract in accordance with the nature of the impulses, positive or negative. The action of this clutch is also more fully explained below.

The positive impulses cause the clutch member 31 to grip frictionally an inner member 32, in this way causing the inner member 32 to revolve with the members 28, 27 and 24ᵃ during the time of the positive impulses. The inner member 32 is secured to the shaft 25, which is the driven shaft.

Upon the occasion of a negative impulse, the clutch 31 is caused to expand into an outer member 33, and release from the inner member 32. During this engagement, the member 33 revolves with the parts 28, 27 and 24ᵃ negatively, during the duration of the negative impulse. But the member 33 is connected, through one or more idler gears 34 mounted on fixed pins or fulcrums, to a driven gear member 35, thus turning member 35 in a positive direction. The member 35, in turn, may be fixedly secured to the shaft 25. However, for reasons explained later, I have shown in this particular embodiment means for permitting member 35 to engage the shaft 25 through free-wheel means such as a roller-type one-way clutch 36. In this way both the positive and negative impulses are imparted in the same direction as positive impulses to the driven shaft 25.

The transmission is shown in its normal position for all intermediate speeds, and for the high-speed direct-drive ratio of one to one. Should it be desired to effect a positive low-gear, the dual yoke 37 is shifted forward until teeth 38 engage teeth 39, thereby giving a positive geared low-speed drive.

By means of a friction brake type clutch 40, more fully described below, a member 41 is prevented from turning, and this in turn prevents a sleeve 26 from turning. Sleeve 26 is splined to the sleeve 23ᵃ. In this way, the gear 23 becomes a fixed gear so that the revolution of the double planet gears 20 about the main axis drives the gear 24 positively forward at the predetermined ratio existing, due to the ratio of the different diameters of the gears 23, 24, etc. Gear 24 is definitely and positively driving forward, so that its sleeve 24ᵃ turns the members 27, 28, 29, 30, 33, 32, and 25 forward, thus providing as set forth above a definite, predetermined, low-speed positive forward drive, ignoring the impulses created by the counterweighted planets.

By releasing the clutch 40, the impulses are allowed to perform their function, as previously described. Immediately after releasing the clutch 40, the dual yoke 37 is shifted back into the position shown, which is the normal position for all intermediate speeds up to and for a ratio of one to one.

By shifting the dual yoke 37 rearwardly until the fork 28 engages a tongue 42, a neutral position is secured. When in this position, the engine may be raced without imparting motion to the driven shaft; whereas, in the normal position shown, the engine may be turned at idling speeds only when it is desired to have the car remain at rest. At idling speeds, the impulses are sufficiently small so that the car may be conveniently held at rest by means of its brakes.

When it is desired to produce a reverse movement of the driven shaft 25, the dual yoke 37 may be shifted rearwardly until the fork 28 engages a tongue 43 of the member 33, at which time a toothed clutch 44 will engage the toothed member 39. When in this position, the member 26 is prevented from turning by the engagement of the brake-clutch 40, which in turn causes the gear 23 to become fixed, thus producing a definite positive low speed (due to the ratio of the diameters of the gears) of sun gear 24 and sleeve 24ᵃ and parts 27, 28, 43, and 33. This forward movement is reversed by means of one or more idler gears 34, thus turning the part 35 in a reverse direction. The part 35 turns the driven shaft 25 in the reverse direction, through the one-way clutch 36 when the latter is properly set, as described below.

As above described, the transmission produces a predetermined positive low-speed drive in reverse, as well as a full range of intermediate speeds, with ratios in forward drive from 0:1 up to 1:1, when operated in the position shown. It will be seen that the friction clutch 40 is used as a holding member for positive low-speed forward, and for reverse. Should a positive, low-speed forward be desired, for descending a steep, slippery hill, it is by this means available, as above described.

The one-way clutch 36 is provided between the member 35 and the driven shaft 25, so that when running forward in the high speed ratio of one to one it will not be necessary for the parts 35, 34, and 33 to continue to turn. But since the part 35 is called upon to drive the driven shaft 25 forwardly during negative impulses, and rearwardly during reverse impulses, the one-way clutch 36 is arranged to be capable of engaging the enlarged portion of a shaft 25 in either direction, at the will of the operator.

To accomplish this, I have provided a shiftable ring 45 which turns with the shaft 25, but which changes its angular relation with the shaft 25 when shifted, due to a cam slot 46. Because of this angular change, a leaf-spring 47 is caused to reverse the direction of its tension in the manner illustrated (see Figure 4). The tension spring 47 engages member 48, and tends to move the roller cage 49 in one direction or the other, and this in turn urges the rollers into engagement in one direction or the other depending upon the sense of the tension of the spring 47. This one-way clutch is illustrated as comprising rollers engaging a cylindrical enlargement of the shaft 25, and suitable undulations machined in the part 35, thus providing a reversible one-way clutch.

In addition, I have in this particular embodiment of the invention provided a one-way clutch operating between the flywheel hub 55 and the driven shaft 25. The purpose of this one-way clutch is to prevent over-running or free-wheeling when free-wheeling is not desired. Should free-wheeling be desired, however, I have provided means for disengaging the one-way clutch 50. For safety reasons, I have provided a release mechanism which may be released while under load, and in order to make the operation instinctive, I propose to operate the sleeve member 51 by means of the clutch pedal or other means which also simultaneously operates clutch 40.

By shifting the ring 51 rearwardly, the rod 52 is moved backwardly, thus allowing pins 53 to move radially inward; thus releasing engagement between shaft 25 and the cam member 54 of the one-way clutch 50. The details of this one-way clutch are more completely shown in Figure 3.

Figure 3:
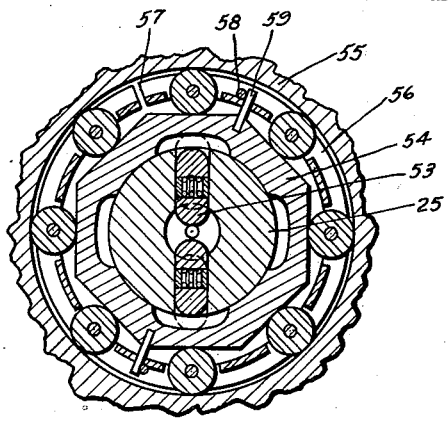
Figure 3 is a section on the line 3—3 of Figure 1.

As shown in Figure 3, when pins 53 are forced out radially, engagement between the shaft 25 and the cam 54 is effected. In order that the pins 53 will not move in and out radially due to centrifugal force, causing undue wear and rattle, spring tension is provided by means of springs arranged at the center portion of the pins 53.

Cage 56 is split at one point 57, so that the cage may be constructed with spring tension, tending to hold rollers outwardly against the cylindrical surface of 55 as described and claimed in my co-pending application, Serial No. 645,665, filed December 5, 1932. Suitable stops 58 and 59 are provided so that this one-way clutch will function in one direction only.

Figure 2:
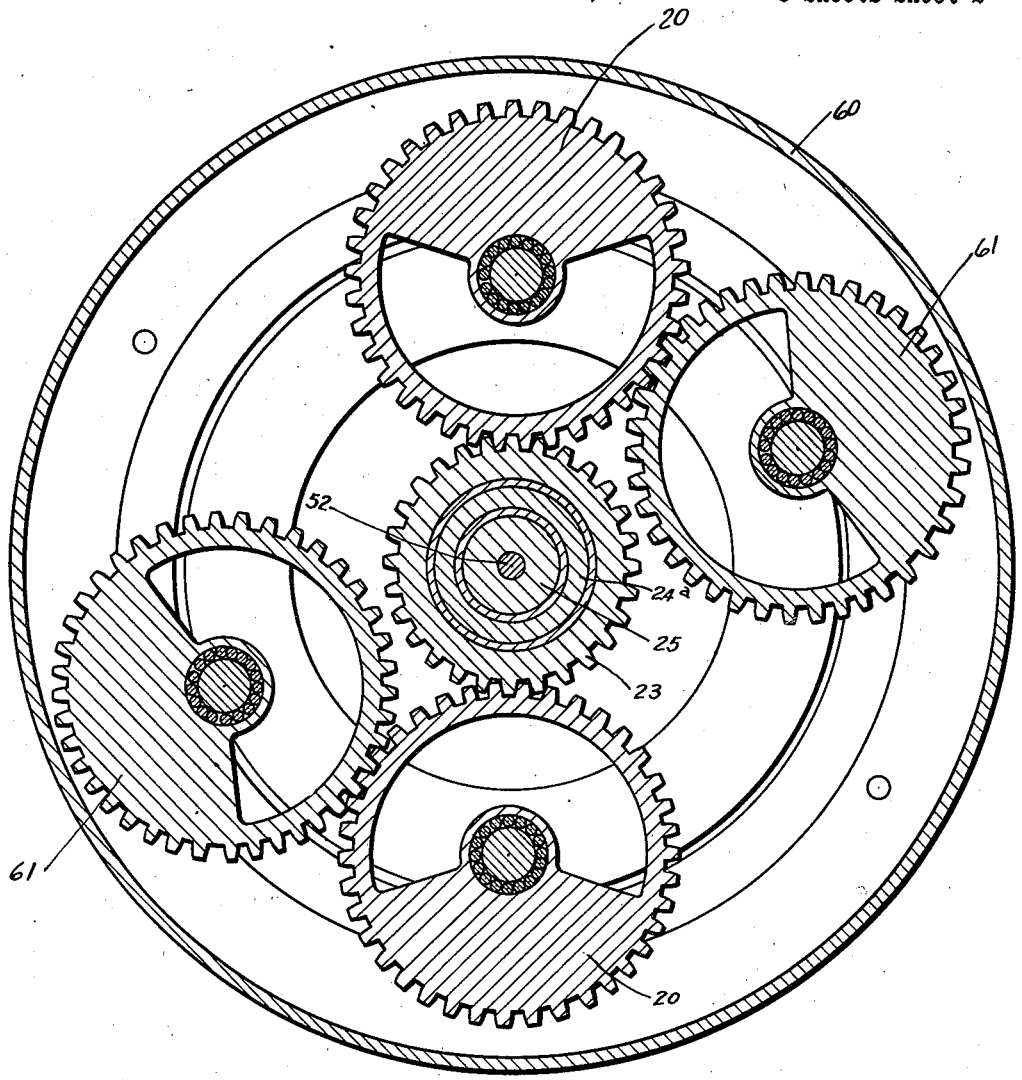
Figure 2 is a transverse section, on the line 2—2 of Figure 1, showing the counter-weighted pinions which form the driving part of the impulse means.

Figure 2 is a section of Figure 1 on the section line 2—2. This figure shows the arrangement of the counter-weighted planet gears. In this view, the outer circle represents the transmission-housing 60. Special attention is called to the arrangement of the counter-weighted planet gears 20 in relation to a set of counter-weighted planet gears 61. By this arrangement the planet gears are arranged in pairs and turn in opposite directions. This arrangement has two advantages, viz: (1) The centrifugal forces acting about the centers of the individual planets 20 and 61 can be opposed, substantially to cancel each other, thus leaving the centrifugal force about the main axis free to function as a simple force unaffected by the centrifugal forces about the centers of the planets. (2) The spacing or location of the counter weights in relation to each other can be altered (without affecting the running balance) to improve the characteristics over and above that of the usual arrangement wherein the counter-weighted planet gears turn in the same direction.

The usual arrangement referred to produces impulses of a character very closely resembling a wave of sine form, whereas by staggering the weights in the manner shown in Figure 2 the impulses may be modified so that the wave representing their character becomes more flat on the top and bottom with steeper slopes than that of the sine form. This is brought about by prolonging the duration of the maximum positive force and also the maximum negative force in each cycle, thereby giving a more abrupt change from positive to negative and vice versa. More time is consumed at the crest and valley and less time is consumed in changing from crest to valley, or from positive to negative, or vice versa.

In operation, with the parts of the transmission described above set for forward drive, the engine drives the flywheel 22 to cause the pinions 20 to be carried around the central axis. The rotation of the pinions causes alternating positive and negative impulses, the positive impulses being transmitted directly to the driven shaft 25 through the member 32 keyed thereto, and the negative impulses being transmitted to member 33 which in turn transmits them to the pinions 34, which reverse the impulses and transmit them in a forward direction to member 35 clutched to the driven shaft 25.

Reverse drive is produced by clutching fork 28 to tongue 43, and at the same time engaging the clutch 44—39 to hold member 26 stationary, giving thereby a positive geared reverse drive. Neutral may be secured by engaging the fork 28 with tongue 42, and when a positive forward drive is desired it is secured by engaging the clutch 38—39 as above described. At high speeds, centrifugal force acting on pinions 20 locks all the parts for rotation in unison, giving in effect a direct drive at a one-to-one ratio.

In Figure 5, I have shown a modification of the invention. In this arrangement, no friction clutch such as 40 is provided, and there is therefore no positive low gear, the low speed ratios being dependent upon the driving impulses. Reverse drive is secured by shifting a yoke 37a rearwardly until a forked member 70 engages the tongue member 43. In this way, member 33 is caused to tend to oscillate. The negative oscillations or impulses may be arrested by a one-way clutch 72, when set to do so by a control lever 73. Thus the member 33 oscillates in a forward direction only. The forward oscillations are reversed by an idler gear or gears 34, thus turning the driven shaft 74 in a reverse direction.

Another feature of this arrangement may be utilized during forward movements, when part 33 turns in a reverse direction. The one-way clutch 72 may be set by the control lever 73 to prevent forward rotation of the part 33, thus establishing a no-back or sprag against reverse movements when forward movements are desired. In this way, the one-way clutch 72 performs two functions:—(1) It acts as the necessary one-way clutch for reverse drive, and it acts as a one-way clutch during forward drive to prevent reverse movements of the driven shaft 74.

Except as above described, this transmission functions like the transmission shown in Figure 1, with the exception that there is no positive low and reverse drive and that no means for cancelling free-wheeling is provided.

In the operation of the transmission of Figure 5, the flywheel 22 carries the pinions 20a around with it, and at low and intermediate speeds the resulting positive and negative impulses are all transmitted in a forward direction to the driven shaft 74, the positive impulses through member 32 the same as in Figure 1, and the negative impulses through member 33 and the reversing pinions 34. The pinions 20a lock the whole transmission in direct drive at high speeds. The clutch 72 is reversed to secure reverse drive.

Figure 6:
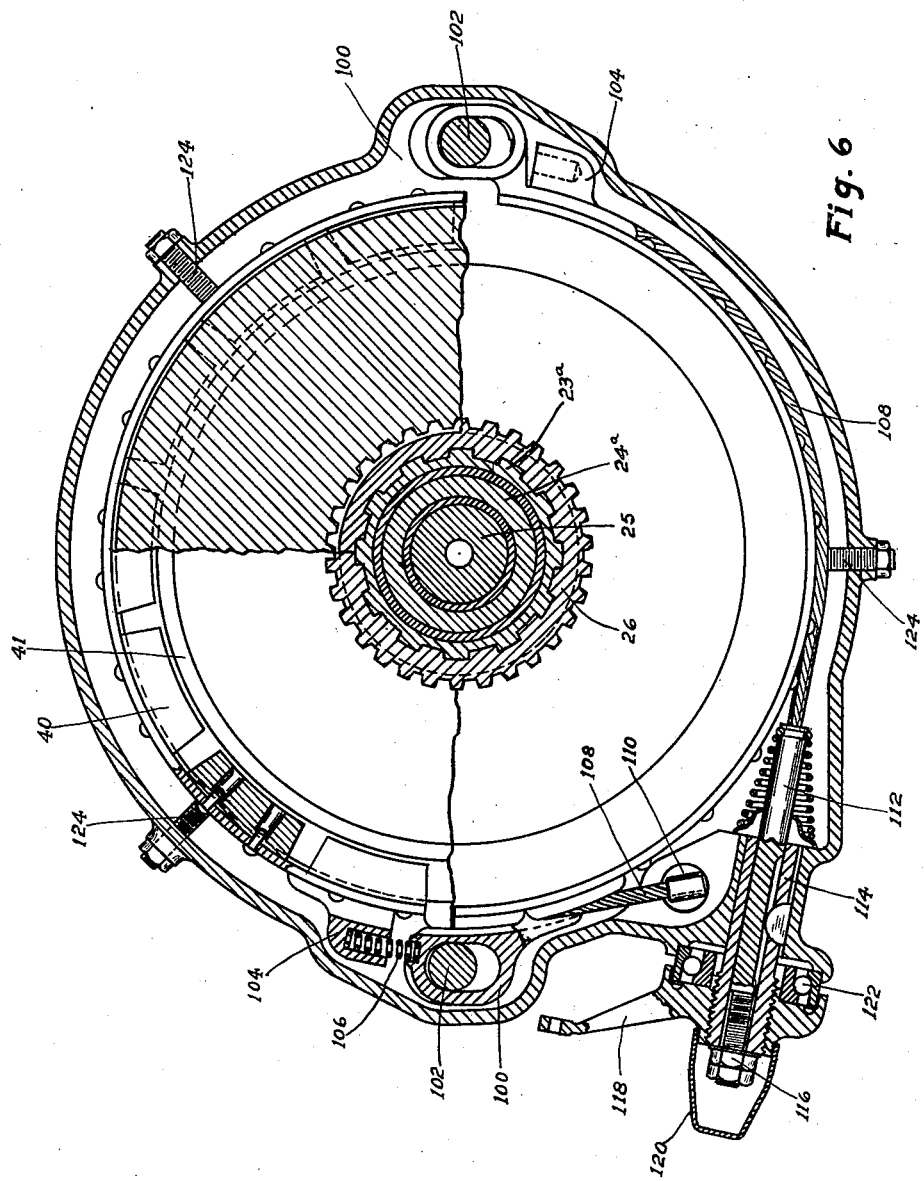
Figure 6 is a transverse section on the line 6—6 of Figure 1, showing the novel friction brake or clutch holding means.

The clutch or brake which forms the holding means is shown in detail in Figure 6. The friction means comprises a band 40 having wedge shaped friction blocks mounted thereon, and engaged by contracting the band with grooves in the drum member 41 described above. The band is formed in two separate halves, in the arrangement illustrated, each half having at one end a lug 100 formed with a slot embracing an anchor pin 102 and having at its other end a thrust lug 104. At one or both sides of the brake a release spring 106 is arranged under compression between the lug 104 of one half of the band and the lug 100 of the other half.

The band is contracted to apply the brake to hold the drum member 41, by means such as an encircling cable or the like 108 fixed on a post 110 at one end, and secured by swaging or otherwise to a fitting 112 passing through and keyed to a sleeve 114 and having threaded thereon at its end an adjusting nut 116. The sleeve 114 has an external course thread meshing with a corresponding thread in the hub of an operating lever 118 connected to the clutch pedal of the car. The lever 118 carries a cap 120 for the adjusting nut 116. A thrust bearing 122 may be provided for the lever 118. Suitable adjustable stops 124 may be provided to determine the released position of the band 40.

The novel reversible one-way friction clutch member 31 is made in two semicircular halves, as shown in Figures 1, 8, and 9, the halves having overlapping portions at their ends as shown in Figure 8. The levers 30 or their equivalents are arranged in alined openings in the overlapping end portions, each being connected if desired to one of said ends by a pivot having a substantial clearance so that it does not take any of the thrust load, so that when the levers 30 are operated in one direction by the operating ring devices 28 they will contract the reversible clutch members on the cylindrical periphery of the member 32, while when the levers are operated in the other direction the reversible clutch members 31 are expanded against and into gripping engagement with the cylindrical interior surface of the member 33. As explained above, this causes the positive impulses to drive directly, while the negative impulses also drive after being reversed. In this form, as well as in the form described below, on account of the clearance about the pivots the thrust is directly from the levers to the friction means and not through the pivots.

The novel yielding means through which the levers 30 are driven is shown in detail in Figure 7. The member 28 is shown made by fastening together three ring-shaped stampings, the outer ones of which are formed with inwardly-extending radial projections 128 embracing between them outwardly-extending radial projections 130 formed on the member 27 which is splined to and driven by the sleeve 24ª. This forms sets of three projections arranged side by side. Between successive sets of projections are compressed coil driving springs 132, shown piloted on projections 134 on the center projections 130. Thus relative movement of members 27 and 28 in either direction compresses the springs 132, so that member 28 is yieldingly driven by member 27 in both directions. Retainer rings 136 may be mounted on opposite sides of the member 28.

In Figures 10 and 11 is shown a somewhat different type of reversible-acting friction clutch member, in the form of a spiral or helical metal friction band 138 adapted to grip member 32 with a wrapping or self-energizing "servo" action when contracted, and to grip the member 33 with a similar action when expanded. The upper lever 30 is shown pivoted to the central convolution of the friction member and in thrust engagement with both of its ends. The lower lever 30 is pivoted to one, and in thrust engagement with the other, of the two convolutions at the bottom of the clutch. Springs 140 may be connected to the ends of member 138, to bias one end of that member toward the member 32 by tending to contract it, and to bias the other end toward the member 33 by tending to expand it, thereby providing a slight drag in neutral.

The levers 30 in Figure 8 are shown with three rounded portions for pivotal thrust engagement with the overlapping end portions of the friction half-members 31 and with the driving forks of the member 28. In Figures 12 and 13 are shown levers 30ª which have straight ends embraced by curved surfaces 142 on the forks of the driving member 28ª. In these figures, also, the end portions of the friction half-members 31ª overlap for a somewhat greater distance. In Figure 13, the normal lever arm is designated "A" while the position in which the member 28ª locks the friction member 31ª in neutral is shown in dotted lines.

In Figures 14 and 15, the friction members 31ᵇ are shown arranged side by side and provided with pivotal sockets 144 for engaging the rounded thrust portions of the levers 30ᵇ.

In Figure 16 is shown the yielding drive utilized in the transmission of Figure 5. It is generally like the yielding drive shown in Figure 7, except that the outer driven projections are in the form of blocks 128ª embracing the inner projections 130 and riveted or otherwise secured to an outer member 146 carrying the forks 70, and to a ring 148 bolted or otherwise secured to the member 146.

As shown in Figure 1, shaft 25 may have a speedometer-drive gear 150 keyed to its rear end. The transmission of Figure 5 has a similar gear 150ª arranged between the bearings 152 at the rear of the driven shaft 74.

As has been explained above, the pinions 34 in both transmissions are provided with fixed fulcrums in the form of pivots 154 carried by the transmission housing.

In the reversible clutches shown in Figures 7–11, the yieldingly driven member 28 which drives the levers 30 is allowed a substantial inner clearance, so that it may shift on the springs 132 to balance its action on the two levers 30. In Figure 17, which shows a clutch generally like that of Figures 10 and 11, the member 28ª has two flattened driving pins 156 on opposite sides, on a line at right angles to a line joining the two levers 30. These pins are arranged in radial slots in a separate lever-driving member 158 having at its ends forks embracing the levers 30. This balances the drive on the two levers by an equalizer action.

Figure 17 also shows certain structural features used in both members 31 and 138. These include slots 160 alternately from the external and internal peripheries, and holes 162 to lessen the weight and therefore the inertia. The slots 160 have a double function, in increasing the flexibility of the friction members and also in providing spaces receiving the oil squeezed out from between the gripping surfaces as the clutch takes hold.

In Figures 18 and 19 I have shown how radial levers 164 may be substituted for the levers 30, being driven by a sleeve 166 which is connected in any desired manner to the yieldingly-driven member 28. In Figure 19 drawn steel stampings 168 and 170 are split helically and spot-welded together to form a friction member similar to member 138. In Figure 18, half-members 172 correspond to members 31, except that the overlapping ends are one outside the other instead of side by side.

The above-described novel reversible one-way clutches have the advantages over roller clutches of being easily reversible in action, and since the same clutch member is used in both directions the gripping in one direction positively insures a release in the other direction. The clutch also has the advantage of a very large wearing surface, and it is not affected by centrifugal force as much as a roller clutch.

The forms having semicircular friction half-members may be given a slight drag, both externally and internally, by springing the half-members slightly either before or after grinding. If sprung before grinding they are held in cylindrical shape during grinding by a suitable fixture, so they will spring back into the deformed shape as soon as released.

In the modification of Figure 20, the reversible one-way friction clutch includes a disk or radial friction member 180 shifted axially one way or the other to engage similar radial friction clutch surfaces on parts 182 and 184, shown formed as integral extensions of the driven parts 32 and 33. Member 180 is shifted one way or the other by a screw thread formed in its hub and forming in effect an operating nut, and which meshes with a corresponding worm or thread on a sleeve 186 formed with slots drivably embracing tongues 188 formed as extensions of the yieldingly driven member 128.

It will be seen that the positive and negative impulses of member 128 shift member 180 axially into driving engagement with member 182 and 184 respectively, and that the device otherwise operates as hereinbefore described.

In the transmission of Figure 21, member 128 is rigidly fastened to a lateral arm or projection 190, to which is anchored one end of a wrapping and self-energizing helical friction band 192, adapted to contract upon the member 32 or expand into the member 33, in the same general manner as hereinbefore described.

While several illustrative embodiments have been described in detail, it is not my intention to limit the scope of the invention to those particular embodiments, or otherwise than by the terms of the appended claims. The present application is a continuation in part of my prior applications No. 532,231, filed April 23, 1931, No. 539,254, filed May 22, 1931, and No. 622,852, filed July 16, 1932. It is my intention to claim in the present application all subject-matter common to the present application and to said earlier applications.

I claim:

1. A transmission comprising a driven member, a driving means actuated to produce positive and negative impulses, means operated for reversing the negative impulses and for transmitting both positive and negative impulses to said driven member as driving impulses all acting in the same direction, and means for operating the driving means to drive the driven member positively at a definite speed reduction independently of said impulses.

2. A transmission comprising a driven member, a driving means actuated to produce positive and negative impulses, means for reversing the negative impulses and for transmitting both positive and negative impulses to said driven member as driving impulses all acting in the same direction, and means for operating the driving means independently of said impulses to drive the driven member positively at a predetermined gear reduction.

3. A transmission comprising a driven member, driving means producing positive and negative impulses, means for reversing the negative impulses and transmitting all the impulses in the same direction to said driven member, and means for limiting the gear reduction of the transmission to a predetermined minimum and driving said driven member positively when said impulses do not cause driving action above said minimum.

4. A transmission comprising a driven member, a driving device producing positive and negative impulses, means for transmitting the positive impulses to the driven member to drive in a forward direction, means for reversing the negative impulses and transmitting them also to the driven member to drive in a forward direction, and a single double-acting one-way clutch device actuated by said impulses to connect the two means alternately to said driving device in synchronism with the reversal of said impulses, the engagement of the one-way clutch device with either of the two means insuring its complete disengagement from the other.

5. A variable speed transmission apparatus comprising, in combination with rotating driving and driven members, an impulse device arranged to be carried around with said driving member, and operating to produce impulses in positive and negative phases, connections between said device and the driven member for rotating the latter during the positive phase, and other connections including reversing pinions mounted on fixed axes for rotating the latter in the same direction during the negative phase.

6. A variable speed transmission apparatus comprising, in combination with rotating driving and driven members, an impulse device arranged to be carried around with said driving member, and operating to produce impulses in positive and negative phases, connections between said device and the driven member for rotating the latter during the positive phase, other connections for rotating the latter in the same direction during the negative phase, and a single reversible-acting one-way clutch device for connecting said two connections alternately to said impulse device in synchronism with the reversal in phase.

7. A variable speed transmission apparatus comprising, in combination with rotating driving and driven members, an impulse device arranged to be carried around with said driving member, and operating to produce impulses in positive and negative phases, connections between said device and the driven member for rotating the latter during the positive phase, other connections for rotating the latter in the same direction during the negative phase, and springs through which said impulse device drives the connections in both phases.

8. A variable speed transmission apparatus comprising, in combination with rotating driving and driven members, an impulse device arranged to be carried around with said driving member, and operating to produce impulses in positive and negative phases, connections between said device and the driven member for rotating the latter during the positive phase, other connections for rotating the latter in the same direction during the negative phase, and positive gearing through which the driven member is driven in reverse drive.

9. A transmission having positive and negative impulse driving means, a driven member, means for transmitting both positive and negative impulses of said driving means in the same direction to the driven member, and means for locking a part of the driving means to give a positive low-speed drive.

10. A transmission having a driven member, positive and negative impulse driving means, means for transmitting both positive and negative impulses thereof to said driven member in the same direction, and means operable at will to lock a part of the driving means to connect said driving means to the driven member for forward positive drive thereof at a predetermined definite speed reduction.

11. A transmission having alternating positive and negative impulse driving means including means for absorbing the negative impulses comprising a helical member actuated to holding position by said negative impulses and actuated to a releasing position by said positive impulses, and coaxial members by the helical member in its holding position and in its releasing position respectively and at least one of which coaxial members forms a driven element of the transmission.

12. A transmission having alternating positive and negative impulse driving means, including means for absorbing the negative impulses comprising a screw and nut actuated to holding position by said negative impulses and actuated to a releasing position by said positive impulses, and members engaged by said nut respectively in its two positions and at least one of which is a driven element of the transmission.

13. A transmission having alternating positive and negative impulse driving means including means for absorbing the negative impulses comprising a spiral-spring clutch member expanded by one type of impulse and contracted by the other type of impulse, and coaxial members engaged by the clutch member respectively when expanded and contracted and at least one of which coaxial members is a driven element of the transmission.

14. A transmission having alternating positive and negative impulse driving means including means for absorbing the negative impulses comprising a friction clutch device expanded by one type of impulse and contracted by the other type of impulse, and two members engaged by said clutch device respectively when it is expanded and when it is contracted and at least one of which members forms a driven element of the transmission.

15. A transmission having alternating positive and negative impulse driving means including means for absorbing the negative impulses comprising a friction clutch band automatically expanded by one type of impulse and contracted by the other type of impulse, and two members engaged by said band respectively when it is expanded and when it is contracted and at least one of which members forms a driven element of the transmission.

16. A transmission or the like having a one-way clutch comprising oppositely-driven members having coaxial cylindrical surfaces, driving means including expansible and contractable friction means between said surfaces and means for alternately expanding and contracting the friction means to engage said surfaces alternately, and driven means directly driven by one of said members and having direction-reversing means drivably connecting it to the other of said members.

17. A transmission or the like having a one-way clutch comprising oppositely-driven members having coaxial cylindrical surfaces, driving means including friction means between said surfaces including an expansible and contractable friction band, and means for alternately expanding and contracting said band to grip said surfaces frictionally alternately and driven means directly driven by one of said members and having direction-reversing means connecting it to the other of said members.

18. A transmission or the like having a yielding drive including coaxial parts one of which has radial members and the other of which has pairs of radial members embracing the radial of the first part, in such a manner that the radial members are arranged in sets of three, and driving springs arranged between the successive sets of said members and driving yieldingly in either direction.

19. A transmission comprising a shiftable yielding driving device, driven means, a clutch for the driven means having an operating element engaged by the shiftable driving device in either of two positions, and a part connected to the clutch engaged by said driving device in one of said positions and locking said clutch in an inactive position.

20. A transmission comprising a shiftable yielding driving device, driven means, a clutch for the driven means having an operating element engaged by the shiftable driving device in any one of three positions, a part connected to the clutch engaged by said driving device in two of said three positions and locking said clutch in an inactive position, and direction-reversing means clutched to the driving device in one of said two positions.

21. A transmission comprising a driven member, positive and negative impulse driving means, means for directly connecting the driving means to the driven member during positive impulses, and direction-reversing means having one one-way clutch through which it drives the driven member and having another one-way clutch through which it is driven by the driving means during negative impulses, said first one-way clutch serving as a sprag preventing reverse rotation of the driven member during forward operation of the transmission.

22. A transmission comprising a driven shaft having driving means at its forward end, a one-way clutch between the driving means and the shaft, a second clutch for positively connecting the shaft to the one-way clutch, control means at the rear end of the shaft for engaging and disengaging said second clutch, and torque-amplifying speed-reducing means between the control means and the driving means and drivably connecting the driving means to said shaft.

23. A transmission comprising a driven shaft having driving means at its forward end, a one-way clutch between the driving means and the shaft, a second clutch having radially-movable plungers for positively connecting the shaft to the one-way clutch, control means at the rear end of the shaft having a part movable axially and centrally of the shaft and having at its forward end means operatively engaging the plungers connecting and disconnecting the shaft and the one-way clutch, and torque-amplifying speed-reducing means between the control means and the driving means and drivably connecting the driving means to said shaft.

24. A transmission comprising planetary driving pinions having weights giving positive and negative impulses as they planetate, torque-amplifying speed-reducing means variably driven by the impulses of said pinions, and means for locking said pinions to a true planetary gear-reduction drive independently of and eliminating the driving effect of said impulses.

25. A transmission comprising a driving member having double-diameter eccentrically-weighted planetary pinions pivoted thereon, two coaxial driven sun gears of different sizes meshing with the different diameter parts of the pinions and having interfitting sleeves rigidly connected thereto, driven means connected to one of said sleeves and including means driven by impulses from the planetating pinions when the other sleeve is free, and means for locking the said other sleeve to drive said driven means positively at a predetermined definite gear ratio.

26. A transmission comprising a driving member having double-diameter eccentrically-weighted planetary pinions pivoted thereon, two coaxial driven sun gears of different sizes meshing with the different diameter parts of the pinions, driven means connected to one of said sun gears and including means driven by impulses from the planetating pinions when the other sun gear is free, and means for locking the said other sun gear to drive said driven means positively at a predetermined definite gear ratio.

27. A transmission comprising a driving member having double-diameter eccentrically-weighted planetary pinions pivoted thereon, two coaxial driven sun gears of different sizes meshing with the different diameter parts of the pinions, driven means connected to one of said sun gears and including means driven by impulses from the planetating pinions when the other sun gear is free, means for locking the said other sun gear to drive said driven means positively at a predetermined definite gear ratio, and direction reversing means arranged to be connected to the driven means when the said other sun gear is so locked, to give a positive geared reverse drive.

28. A transmission comprising a central shaft, alternating impulse driving means at the forward end of said shaft, driven means at the rear end of said shaft, and means mounted on the shaft between the driving means and the driven means for transmitting the impulses of the driving means to the driven means, said last named means including a part axially shiftable upon the shaft for connecting the driving means and the driven means alternatively for forward and reverse drive and having a third intermediate position for disconnecting the driving means and the driven means to give a "neutral" position.

29. A transmission comprising driving means including a radially-extending yielding drive member, and driven means including a one-way clutch having an operating lever extending parallel to the axis of the transmission and engaged by said drive member.

30. A transmission comprising driving means including a radially-extending yielding drive member, and driven means including a one-way clutch having an operating lever extending parallel to the axis of the transmission and engaged by said drive member, said clutch having a locking part adjacent said lever, and said drive member being shiftable lengthwise of said lever to engage said part and lock said clutch out of operation.

31. A transmission comprising driving means including a radially-extending yielding drive member, and driven means including a one-way clutch having an operating lever extending parallel to the axis of the transmission and engaged by said drive member, said clutch having a locking part adjacent said lever, and said drive member being shiftable lengthwise of said lever to engage said part and lock said clutch out of operation, and direction-reversing means locked to said drive member by shifting it further and while said clutch is so held locked out of operation.

32. Impulse driving means for a transmission comprising a planet carrier arranged as a drive element, eccentrically-weighted planet pinions mounted thereon in intermeshing pairs to be driven in opposite directions about their own axes while they planetate in the same direction, one of each of said pairs having portions of large and small diameter, and coaxial large and small sun gears arranged coaxially with respect to the planet carrier and meshing respectively with the small and large diameter portions of said pinions.

33. A transmission comprising a casing, a driven shaft therein, positive and negative impulse driving means in the casing arranged coaxially of the shaft, adjacent driven members one of which is directly connected to the shaft, direction-changing means fulcrumed on the casing and connecting the other of the driven members to the shaft, and a one-way clutch device driven by the impulse means and operatively engaging one of said driven members during the positive impulses and operatively engaging the other of the driven members during the negative impulses.

34. A transmission comprising a casing, a driven shaft therein, positive and negative impulse driving means in the casing arranged coaxially of the shaft, adjacent driven members one of which is directly connected to the shaft, direction-changing means fulcrumed on the casing and connecting the other of the driven members to the shaft, a one-way clutch device driven by the impulse means and operatively engaging one of said driven members during the positive impulses and operatively engaging the other of the driven members during the negative impulses, another one-way clutch device arranged between the casing and the said other one of the driven members, and means for locking out the first one-way clutch device and simultaneously connecting the driving means directly to said other member.

35. A transmission comprising a member driven alternately in opposite directions and having a screw thread, a nut mounted on said thread and shifted axially in opposite directions as said member reverses its direction of drive, a driven member, a part engaged by said nut as it is shifted in one direction and which is connected to drive said shaft directly, and another part engaged by said nut as it is shifted in the other direction and which has direction-reversing means connecting it to said driven member.

36. A transmission comprising a member urged alternately in opposite directions and having a screw thread, a nut mounted on said thread and shifted axially in opposite directions as said member reverses its direction of drive, a driven member, a part engaged by said nut as it is shifted in one direction and which is connected to drive said shaft directly, and another part engaged by said nut as it is shifted in the other direction and which takes the negative impulses of the first member.

ADIEL Y. DODGE.